(12) United States Patent
Murad et al.

(10) Patent No.: US 11,089,239 B1
(45) Date of Patent: Aug. 10, 2021

(54) SYSTEM AND METHOD TO MODIFY UNDERCARRIAGE CAMERA IMAGE FEED

(71) Applicant: GM GLOBAL TECHNOLOGY OPERATIONS LLC, Detroit, MI (US)

(72) Inventors: Mohannad Murad, Troy, MI (US); Wende Zhang, Birmingham, MI (US); Sai Vishnu Aluru, Commerce Township, MI (US); Christopher A. Stanek, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/877,581

(22) Filed: May 19, 2020

(51) Int. Cl.
| | |
|---|---|
| *H04N 7/00* | (2011.01) |
| *H04N 5/265* | (2006.01) |
| *H04N 7/18* | (2006.01) |
| *H04N 5/232* | (2006.01) |
| *B60R 11/04* | (2006.01) |
| *H04N 5/247* | (2006.01) |
| *B60R 11/00* | (2006.01) |

(52) U.S. Cl.
CPC .............. *H04N 5/265* (2013.01); *B60R 11/04* (2013.01); *H04N 5/23238* (2013.01); *H04N 5/247* (2013.01); *H04N 7/181* (2013.01); *B60R 2011/004* (2013.01)

(58) Field of Classification Search
CPC ........... B60R 1/00; B60R 1/105; B60R 11/04; B60R 2300/303
See application file for complete search history.

(56) References Cited

U.S. PATENT DOCUMENTS

| | | | | |
|---|---|---|---|---|
| 8,605,947 | B2* | 12/2013 | Zhang | G08G 1/167 382/104 |
| 9,681,062 | B2* | 6/2017 | Kussel | B60R 1/00 |
| 2010/0097458 | A1* | 4/2010 | Zhang | G06T 7/74 348/119 |
| 2014/0240500 | A1* | 8/2014 | Davies | B60R 1/00 348/148 |
| 2017/0372147 | A1* | 12/2017 | Stervik | G06K 9/00791 |
| 2019/0135216 | A1* | 5/2019 | Church | B60R 1/00 |
| 2019/0295318 | A1* | 9/2019 | Levinson | G06N 20/00 |
| 2020/0023772 | A1* | 1/2020 | Kurnaz | G06T 5/007 |

* cited by examiner

*Primary Examiner* — Peet Dhillon
(74) *Attorney, Agent, or Firm* — Lorenz & Kopf LLP

(57) ABSTRACT

One general aspect includes a system to modify an image feed from a second camera of a vehicle, the system includes a memory configured to include one or more executable instructions and a processor configured to execute the executable instructions, where the executable instructions enable the processor to receive a first image feed from a first camera located on the vehicle; monitor one or more image characteristics of the first image feed; receive the second image feed from the second camera located on the vehicle; and based on the monitored one or more image characteristics of the first image feed, modify the second image feed such that one or more image characteristics of the second image feed are substantially similar to the monitored one or more image characteristics of the first image feed.

14 Claims, 3 Drawing Sheets

SYSTEM AND METHOD TO MODIFY UNDERCARRIAGE CAMERA IMAGE FEED

INTRODUCTION

Undercarriage or underbody cameras are useful on vehicles that can go off road. The views from these cameras help a vehicle operator know if they are driving over any potentially dangerous rocks and how to best avoid hitting those rocks against the underside of the vehicle. Their views also help to add to and enhance viewport images such as, for example, top-down images, which help drivers get in and out of tight spaces. However, since it can be very shaded under the vehicle, at various points throughout the day, images captured by the camera can come with lighting and/or color issues. For example, the images can be unduly faded and thus make it hard for the vehicle's operator to actually know the exact location rocks and other debris is located under their vehicle. Moreover, when such vague views are stitched into an overarching viewport image, the image feed can be starkly different than the feeds from the other cameras being used to produce the viewport image. This can lead to the viewport image having an undesirable quilt-like pattern as well as cause the vehicle's operator to get distracted by the offset image on their screen. It is therefore desirable to provide a system and method that will enhance the image quality of the feed produced by the undercarriage/underbody camera for a vehicle, so as to enhance visibility underneath the vehicle as well as make for more desirable and effective viewport vehicle operations enhancement images (i.e., vehicle top-down images). Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to modify an image feed from a second camera of a vehicle, the method includes: receiving a first image feed from a first camera located on the vehicle; monitoring one or more image characteristics of the first image feed; receiving the second image feed from the second camera located on the vehicle; and based on the monitored one or more image characteristics of the first image feed, modifying the second image feed such that one or more image characteristics of the second image feed are substantially similar to the monitored one or more image characteristics of the first image feed. Other embodiments of this aspect include corresponding computer systems, apparatus, and computer programs recorded on one or more computer storage devices, each configured to perform the actions of the methods.

Implementations may include one or more of the following features. The method further includes receiving vehicle location information, weather information, lighting information, or some combination thereof; and associating the vehicle location information, weather information, lighting information, or some combination thereof with the monitored one or more image characteristics of the first image feed. The method further includes: storing the vehicle location information, weather information, lighting information, or some combination thereof to a memory while the vehicle is at a first vehicle location; allowing the vehicle to move from the first vehicle location to a second vehicle location; for the second vehicle location, receiving additional vehicle location information, additional weather information, additional lighting information, or some combination thereof; comparing the vehicle location information, weather information, lighting information, or some combination thereof of the first vehicle location with the additional vehicle location information, additional weather information, additional lighting information, or some combination thereof of the second vehicle location; and where, when the additional vehicle location information, additional weather information, additional lighting information, or some combination thereof of the second vehicle location is substantially similar to the vehicle location information, weather information, lighting information, or some combination thereof of the first vehicle location, the second image feed at the second vehicle location is furthered modified based on the vehicle location information, weather information, lighting information, or some combination thereof of the first vehicle location. The method further includes receiving vehicle speed information; and where the second image feed is furthered modified based on the vehicle speed information. The method further includes: receiving a third image feed from a third camera located on the vehicle; receiving a fourth image feed from a fourth camera located on the vehicle; receiving a fifth image feed from a fifth camera located on the vehicle; and combining the first, second, third, fourth, and fifth image feeds together so as to generate a viewport image. The method where the first camera is installed on a front fascia of the vehicle, and where the first image feed captures images of a portion of a vehicle environment located in front of the vehicle. The method where the second camera is installed on an undercarriage of the vehicle, and where the second image feed captures images of a portion of a vehicle environment located under the vehicle. Implementations of the described techniques may include hardware, a method or process, or computer software on a computer-accessible medium.

One general aspect includes a system to modify an image feed from a second camera of a vehicle, the system includes a memory configured to include one or more executable instructions and a processor configured to execute the executable instructions, where the executable instructions enable the processor to receive a first image feed from a first camera located on the vehicle; monitor one or more image characteristics of the first image feed; receive the second image feed from the second camera located on the vehicle; and based on the monitored one or more image characteristics of the first image feed, modify the second image feed such that one or more image characteristics of the second image feed are substantially similar to the monitored one or more image characteristics of the first image feed. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to receive vehicle location information, weather information, lighting information, or some combination thereof; and associate the vehicle location information, weather information, lighting information, or some combination thereof with the monitored one or more image characteristics of the first image feed. The system where the executable instructions enable the processor to store the vehicle location information, weather information, lighting information, or some combination thereof to a memory while the vehicle is at a first vehicle location; allow the vehicle to move from the first vehicle location to a second vehicle location; for the second vehicle location, receive additional vehicle location information, additional weather information, additional lighting information, or some combination thereof; compare the vehicle location information, weather information, lighting information, or some combination thereof of the first vehicle location with the additional vehicle location information, additional weather information, additional lighting information, or some combination thereof of the second vehicle location; and where, when the additional vehicle location information, additional weather information, additional lighting information, or some combination thereof of the second vehicle location is substantially similar to the vehicle location information, weather information, lighting information, or some combination thereof of the first vehicle location, the second image feed at the second vehicle location is furthered modified based on the vehicle location information, weather information, lighting information, or some combination thereof of the first vehicle location. The system where the executable instructions enable the processor to receive vehicle speed information; and where the second image feed is furthered modified based on the vehicle speed information. The system where the executable instructions enable the processor to: receive a third image feed from a third camera located on the vehicle; receive a fourth image feed from a fourth camera located on the vehicle; receive a fifth image feed from a fifth camera located on the vehicle; and combine the first, second, third, fourth, and fifth image feeds together so as to generate a viewport image. The system where the first camera is installed on a front fascia of the vehicle, and where the first image feed captures images of a portion of a vehicle environment located in front of the vehicle. The system where the second camera is installed on an undercarriage of the vehicle, and where the second image feed captures images of a portion of a vehicle environment located under the vehicle. Implementations of the described techniques may include hardware, a method or process, or computer software on a computer-accessible medium.

One general aspect includes a system to modify an image feed from a second camera of a vehicle, the system includes: a memory configured to include one or more executable instructions and a processor configured to execute the executable instructions, where the executable instructions enable the processor to: receive a first image feed from a first camera located on the vehicle; receive the second image feed from a second camera installed on an undercarriage of the vehicle, the second camera configured to capture an image of an area beneath the vehicle; and combine the first and second image feeds together so as to generate a viewport image. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to monitor one or more image characteristics of the first image feed; receive the second image feed from the second camera located on the vehicle; and based on the monitored one or more image characteristics of the first image feed, modify the second image feed such that one or more image characteristics of the second image feed are substantially similar to the monitored one or more image characteristics of the first image feed. The system where the executable instructions enable the processor to receive vehicle location information, weather information, lighting information, or some combination thereof; and associate the vehicle location information, weather information, lighting information, or some combination thereof with the monitored one or more image characteristics of the first image feed. The system where the executable instructions enable the processor to store the vehicle location information, weather information, lighting information, or some combination thereof to a memory while the vehicle is at a first vehicle location; allow the vehicle to move from the first vehicle location to a second vehicle location; for the second vehicle location, receive additional vehicle location information, additional weather information, additional lighting information, or some combination thereof; compare the vehicle location information, weather information, lighting information, or some combination thereof of the first vehicle location with the additional vehicle location information, additional weather information, additional lighting information, or some combination thereof of the second vehicle location; and where, when the additional vehicle location information, additional weather information, additional lighting information, or some combination thereof of the second vehicle location is substantially similar to the vehicle location information, weather information, lighting information, or some combination thereof of the first vehicle location, the second image feed at the second vehicle location is furthered modified based on the vehicle location information, weather information, lighting information, or some combination thereof of the first vehicle location. The system where the executable instructions enable the processor to receive vehicle speed information; and where the second image feed is furthered modified based on the vehicle speed information. The system where the first camera is installed on a front fascia of the vehicle, and where the first image feed captures images of a portion of a vehicle environment located in front of the vehicle. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
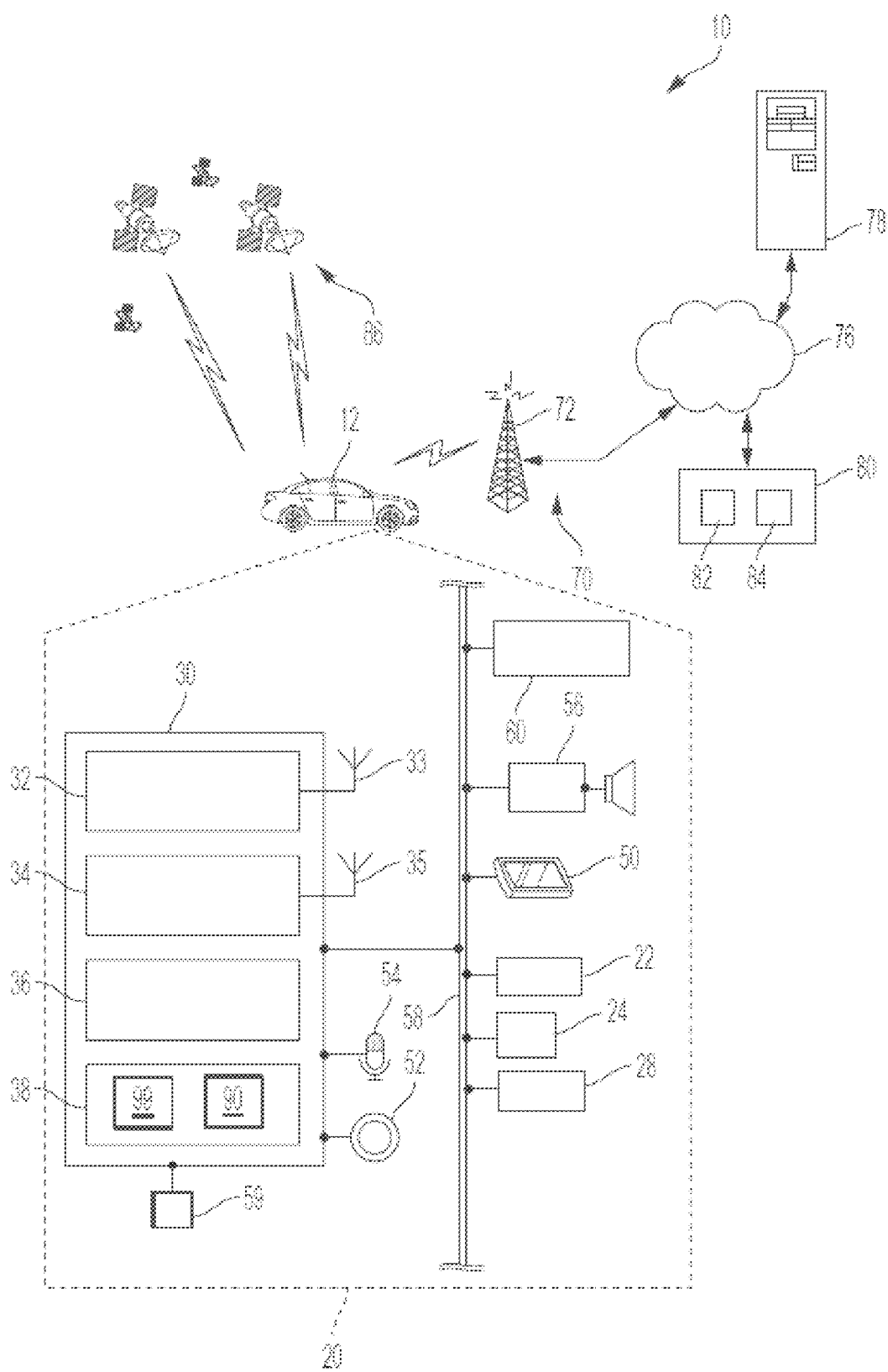
FIG. 1 is a block diagram depicting an exemplary embodiment of system capable of utilizing the system and method disclosed herein.
Figure 2:
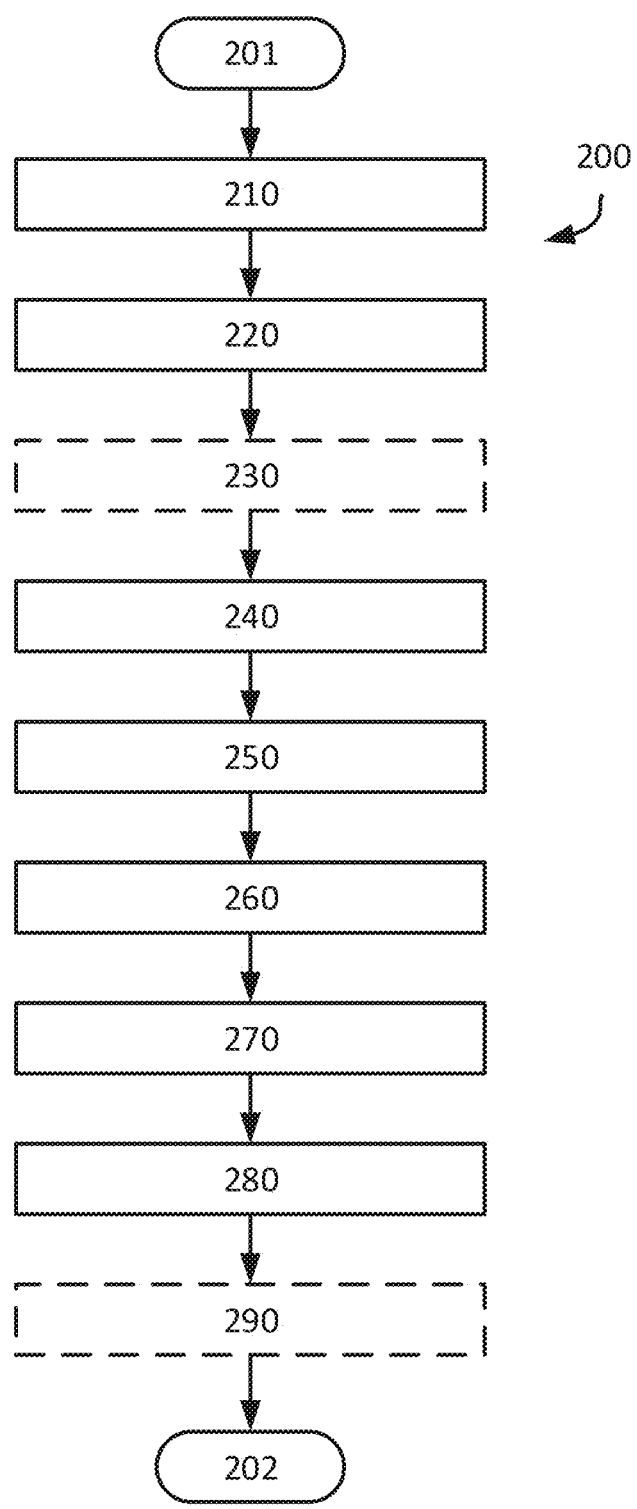
FIG. 2 shows a flow chart generally illustrating an exemplary method that may be performed to enhance undercarriage camera image quality.

With reference to FIG. 1, there is shown an operating environment that comprises a communications system 10 and that can be used to implement the method disclosed herein. Communications system 10 generally includes a vehicle 12 that includes vehicle electronics 20, one or more wireless carrier systems 70, a land communications network 76, a computer or server 78, a vehicle backend services facility 80, and a constellation of global navigation satellite system (GNSS) satellites 86. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSMs, such as the onboard computer 60. In one embodiment (as shown in FIG. 1), the wireless communications module 30 and/or a telematics unit can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, power windows, power sun/moon roof, the vehicle's head lamps, horn system, air conditioning, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state, based on one or more onboard vehicle sensor readings, as discussed more below.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80. And, in other embodiments, other protocols can be used for V2V or V2I communications.

The SRWC circuitry 32 (i.e., a SRWC transceiver) enables the telematics unit 30 to transmit and receive SRWC signals, such as Bluetooth Low Energy (BLE) signals, along various network connection types. The SRWC circuitry 32 can allow the telematics unit 30 to connect to another SRWC device via one or more connections. Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the telematics unit 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Telematics unit 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Memory 38 can also store, for example, an image quality statistics filter 90 (IQ stat 90). The IQ stat 90 can take image quality parameters such as tone-mapping, gamma value, auto white balance, temperature, exposure value of a scene and produce a filtering output therefrom. In one or more embodiments, IQ stat 90 can take additional factors into account when producing the filtering output data. For example, IQ stat 90 may receive vehicle location information, weather information (discussed below), lighting information, and vehicle speed. IQ stat 90 can be embodied as a lookup table (i.e., populated with precalculated outputs for each possible array of inputs) or a transfer function (i.e., a mathematical function which models the filter's output for each possible array of inputs). It should be understood that the image quality parameter inputs for IQ stat 90 may be retrieved from the image feed of a first camera (e.g., the forward camera module or FM). It should also be understood that the filtering output data can be used to modify the image feed of a second camera (e.g., an undercarriage camera). Moreover, the filtering output data may be used to modify the second camera's image feed in such a way that the image feed will have a substantially similar quality as the first camera's image feed. As follows, if lighting issues (i.e., due to shadows) or color content issues exist in the second camera's image feed, these lighting/coloring issues will be absolved when the image feed is modified to have qualities similar to the superior image feed quality of the first camera.

Memory 38 can also store, for example, a weather prediction/forecasting application 99 (e.g., RADARSCOPE™, DARK SKIES WEATHER, WEATHER BUG™, THE WEATHER COMPANY', etc.) which provides location-based reporting live and forecast data on hyperlocal weather to system users. In particular, the weather app 99 can provide users with a wealth of meteorological data such as temperature, wind, and visibility on a minute-by-minute, hourly, or daily basis, as well as an extended 10-day forecast. For example, the weather app 99 can implement Doppler radar and satellite imaging to attain the current weather of a certain area (e.g., the vehicle location) and/or predict the weather of that area based on location information feedback from a system user or some other device (e.g., vehicle 12). As follows, weather app 99 can collaborate with GNSS receiver 22 to provide vehicle location data to a backend (e.g., backend services facility 80) and the backend will responsively provide up-to-date weather information for the vehicle's location. It should be understood that the weather app 99 may be installed at remote facility 80 (e.g., databases 84) or at computer 78.

Vehicle electronics 20 also includes a number of vehicle-user interfaces that provide vehicle occupants with a means of providing and/or receiving information, including visual display 50, pushbutton(s) 52, microphone 54, audio system 56, and a plurality of cameras 59. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics unit 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD, and other multimedia functionality. This functionality can be provided in conjunction with or independent of an infotainment module. Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. Various other vehicle-user interfaces can also be utilized, as the interfaces of FIG. 1 are only an example of one particular implementation.

Each camera of the plurality of cameras 59 can be a wide lens or ultra-wide lens camera of the digital variety and can capture one or more images (i.e., video feed or image information), which can then be transmitted to telematics unit 30 and processor 36. To name a few locations, the camera(s) 59 can be installed on the rear fascia of the vehicle body, the front fascia of the vehicle body, the vehicle's windshield (i.e., a forward camera module), one or more of the vehicle's side-view mirrors (e.g., driver side and passenger side), and/or the vehicle's undercarriage. In addition, the cameras 59 can be positioned around the vehicle body to capture video feeds that will assist a vehicle operator in operating some aspect of vehicle 12. For example, the camera(s) installed on the rear fascia can capture one or more images of a portion of the environment situated behind vehicle 12, the camera(s) installed on the front fascia and/or windshield can capture one or more images of a portion of the environment situated out in front of vehicle 12, the camera(s) installed on the undercarriage of vehicle 12 can capture one or more images of a portion of the environment situated beneath vehicle 12, and the camera(s) installed on the side-view mirrors can capture one or more images of a portion of the environment situated to the left and/or right side of vehicle 12. Moreover, these video feeds can be combined/merged together (otherwise thought of as being stitched together) to generate a viewport image such as, for example, a surround-view (360-view) of the vehicle's environment, a top-down/ground view of the vehicle, a split-screen view (e.g., involving an undercarriage view being juxtaposed with a forward camera module view), a front-blind view, a reverse-blind view, a merged view (e.g., involving both an undercarriage view and forward camera module view being blended together so as to create a simulated single view), or a three-dimensional (3D) vehicle-surround view (e.g., involving front, rear, right-side, left-side, and undercarriage vehicle-centric views being merged together to generate the viewport image as well as a graphical representation of vehicle 12 being overlaid onto the viewport image).

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility (or remote entity), meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82 or live advisors. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases 84 at the remote facility 80 can store various information and can include a vehicle operation database that stores information regarding the operation of various vehicles (e.g., vehicle telemetry or sensor data).

Method

The method or parts thereof can be implemented in a computer program product (e.g., telematics unit 30, a video processing module, etc.) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Method 200 begins at 201 in which the vehicle is moving along a route, for example, traveling along a roadway or off-road trail. In step 210, a camera 59 on the front fascia of vehicle 12 is activated (i.e., a first camera) and will begin producing an image feed (i.e., a first image feed). Moreover, the image feed of this front camera 59 will be received at telematics unit 30. It should be understood that this first camera 59 may alternatively be installed on the front grill of vehicle 12 or may be embodied as the forward camera module (FCM) of vehicle 12. It should also be understood that this image feed corresponds to a portion of the environment situated directly out front of vehicle 12.

In step 220, telematics unit 30 will monitor the image quality characteristics of the image feed from the first camera 59. For example, telematics unit 30 will evaluate the image tone mapping, image brightness, auto-white balance, and level of exposure of one or more images from this image feed and thus determine the values of each of these quality characteristics. In addition, in this step, telematics unit 30 will store these first image feed quality characteristics to memory 38.

In optional step 230, when monitoring the image quality characteristics of the first image feed (i.e., at this first location), telematics unit 30 will automatically retrieve the vehicle's location (via GNSS receiver 22), the vehicle's speed (via the vehicle's speedometer), weather information (via weather app) for the environment directly surrounding the vehicle 12, and lighting information (ambient lighting within a particular range of vehicle 12 sensed via a light sensor installed on the vehicle). Telematics unit 30 will also at least temporarily store this information in memory 30 as being associated with the monitored image quality characteristics of the image feed from the first camera 59. At least some of this information can also be used to create benchmarks for environmental circumstances deemed similar to the vehicle location in which the characteristics of the first video feed had been monitored (i.e., a first vehicle location). As such, the vehicle location information, speed information, weather information, and/or lighting information can be used to help determine when a subsequent vehicle location (i.e., a second vehicle location) has one or more substantially similar environmental circumstances as the first/current vehicle location. Furthermore, as discussed below, when the second vehicle location has one or more substantially similar environmental circumstances, telematics unit 30 can retrieve from memory 38 the stored quality characteristics that were monitored for the first camera feed.

In step 240, a camera 59 installed on the undercarriage of vehicle 12 is activated (i.e., a second camera) and will begin producing an image feed (i.e., a second image feed). Moreover, the image feed of this underbody camera 59 will be received at telematics unit 30. It should be understood that at least steps 230 and 240 are non-sequential and thus step 240 may come before optional step 230. It should also be understood that this image feed corresponds to a portion of the environment situated directly below the vehicle 12, as mentioned above.

Figure 3A:
FIG. 3A shows one or more aspects of the exemplary method of FIG. 2.
Figure 3B:
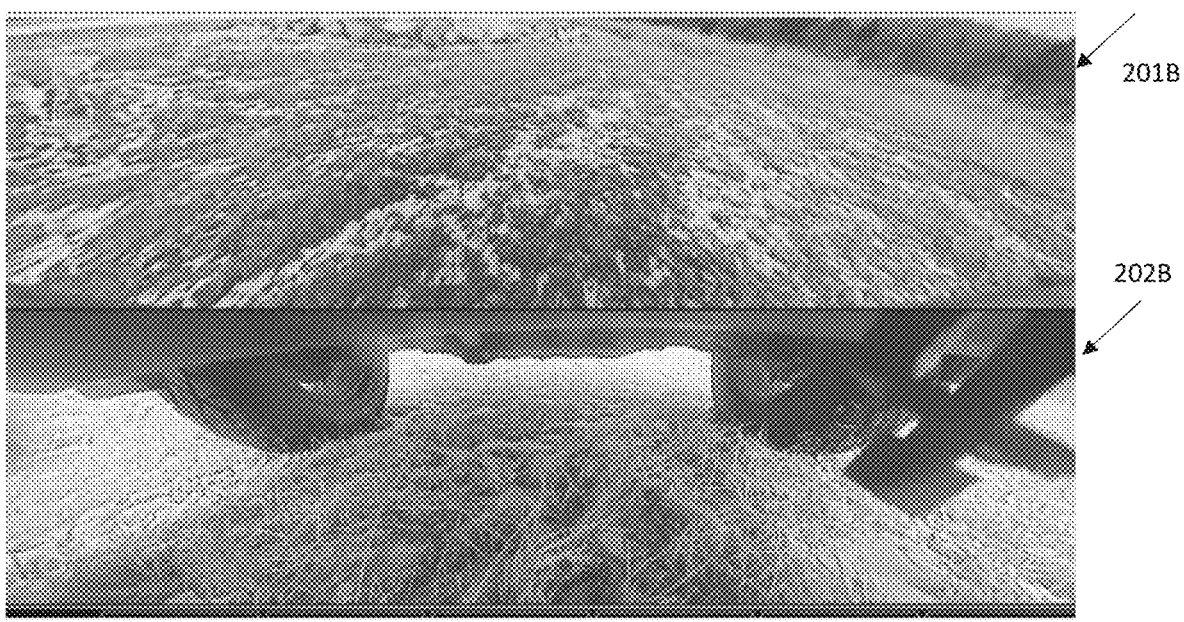
FIG. 3B shows one or more additional aspects of the exemplary method of FIG. 2.

In step 250, with additional reference to FIGS. 3A and 3B, telematics unit 30 will modify the image characteristics of this second image feed based on the recorded characteristics of the first feed. For example, telematics unit 30 will input the monitored image characteristics from the first image feed into IQ Stat 90 to get image quality values that can be used to modify the second image feed. As such, using output values from IQ stat 90, telematics unit 30 will adjust at least one of the image tone-mapping, gamma value, image brightness, auto white balance, temperature, exposure value of one or more images of the second image feed. Moreover, the image tone-mapping, gamma value, image brightness, auto-white balance, and level of exposure of the image(s) will be adjusted such that they cause the second camera image feed to have substantially similar quality characteristics as the image(s) of the first image feed. As follows, the image tone mapping, image brightness, gamma value, temperature, auto-white balance, and level of exposure of the second camera feed image(s) may have the save values as the characteristics of the first camera feed image(s) or these second camera feed characteristics may end up with values that, when displayed, would cause the second image feed to appear to have the same characteristics as the first image feed. Thus, as can be seen, image(s) from the second camera feed 202A will be modified to include characteristics that are substantially similar (i.e., almost identical) to the first camera feed 201A. As shown, the characteristics of this modified second camera feed 202B will thus end up appearing almost identical (if not the same as) the characteristics of the first camera feed 201B. It should be understood that the image feed processing aspects of method 200 may be conducted by telematics unit 30 or these processing aspects can be carried out by a separate, stand-alone component of the vehicle's electronics 20 such as, for example, a video processing module (which can be one of the VSMs 28). In those embodiments in which the processing aspects are carried out by a VSM 28 (e.g., video processing module), or some other component of the vehicle electronics 20 (e.g., on-board computer 60), the VSM 28 will be in operative communication with telematics unit 30, in accordance with the communications system 10 discussed above.

In step 260, a camera 59 on the rear fascia of vehicle 12 is activated (i.e., a third camera) and will begin producing an image feed (i.e., a third image feed). As skilled artisans will see, this third camera can also be known as a backup camera 59. In addition, in this step, a camera 59 on the underside of the driver-side side-view mirror of vehicle 12 is activated (i.e., a fourth camera) and will begin producing an image feed (i.e., a fourth image feed). In furtherance, in this step, a camera 59 on the underside of the passenger-side side-view mirror of vehicle 12 is activated (i.e., a fifth camera) and will begin producing an image feed (i.e., a fifth image feed). Moreover, the third, fourth, and fifth image feeds from these cameras will be received at telematics unit 30.

In step 270, the image feeds from the first, second, third, fourth, and fifth cameras 59 (i.e., the first, second, third, fourth, and fifth camera feeds) will be combined together to generate a broad viewport image. For example, the first, second, third, fourth, and fifth camera feeds will be virtually stitched together (combined) to generate a seamless or semi-seamless, top-down view of vehicle 12 (or any other exemplary viewport image type discussed above). As follows, due to the modifications of the undercarriage camera image feed made in step 250, the independent camera feeds will have substantially similar image quality characteristics. Thus, when displayed, the viewport image will not appear to include an image of the areas located below vehicle 12 that readily appears to be different than its counterpart image feeds (i.e., those feeds from the cameras that capture images of locations surrounding the vehicle 12). This will help mitigate viewer distraction due to one of the images being difficult to view and/or looking drastically different than the counterpart images being exhibited. Moreover, a graphical representation of an outline of vehicle 12 may be overlaid onto this viewport image to give a viewer of the image an understanding as to where objects captured from the vehicle environment are located relative to the vehicle's components (e.g., one or more tires of vehicle 12). Viewport images such as top-down vehicle views are well known.

In step 280, telematics unit 30 will format the viewport image to be exhibited on display 50 and, at least temporarily, store the viewport image to memory 38. Moreover, in one or more embodiments, telematics unit 30 will determine whether the speed of vehicle 12 is less than a threshold speed (e.g., 5 miles per hour). If the speed happens to be less than this preestablished threshold, then telematics unit 30 will automatically retrieve the viewport image from memory 38 and cause the formatted image to be exhibited on display 50. In one or more alternative embodiments, a user will press a virtual button on a graphical user interface (GUI) on display 50 that will manually cause the formatted viewport image to be exhibited on display 50. At some point during step 280, telematics unit 30 will stop exhibiting the viewport image on display 50.

In optional step 290, vehicle 12 will move from its original location (i.e., the first vehicle location—where the image characteristics of the first video feed were monitored) to a subsequent second vehicle location. In addition, at this second vehicle location, telematics unit 30 will again retrieve the vehicle's location (i.e., additional vehicle location information), the vehicle's speed (i.e., additional speed information), weather information (i.e., additional weather information), and lighting information (i.e., additional lighting information). Telematics unit 30 will also compare this additional information with the information captured at the first vehicle location, to see whether one or more of the environmental factors are the same as or close to corresponding factors retrieved at the first vehicle location. For example, telematics unit 30 will compare the lighting and/or weather information of the first vehicle location with the lighting and/or weather information of the second vehicle location. If one or more of these environmental factors are the same or substantially similar (e.g., the factors, as compared, are off by 5% or less), then telematics unit 30 will activate the vehicle undercarriage camera 59 and cause it to produce an image feed. Telematics unit 30 will also modify this image feed (the second camera image feed) based on the recorded characteristics of the first feed (e.g., a recorded output from IQ stat 90), which were monitored in the first vehicle location. In this way, telematics unit 30 deploys a machine-learning based technique that causes the sensor inputs to proactively initiate the telematics unit 30 to modify the image characteristics of the second camera sensor feed upon the vehicle arriving at a new location that is environmentally similar to the first vehicle location. After step 290, method 200 will move to completion 202.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to modify a second image feed from a second camera of a vehicle, the method comprising:
   receiving a first image feed from a first camera located on the vehicle;
   monitoring one or more image characteristics of the first image feed;
   receiving vehicle location information, weather information, lighting information, or some combination thereof;
   associating the vehicle location information, weather information, lighting information, or some combination thereof with the monitored one or more image characteristics of the first image feed;
   storing the vehicle location information, weather information, lighting information, or some combination thereof to a memory while the vehicle is at a first vehicle location;

receiving the second image feed from the second camera located on the vehicle;

based on the monitored one or more image characteristics of the first image feed, modifying the second image feed to generate a modified second image feed such that one or more image characteristics of the second image feed are substantially similar to the monitored one or more image characteristics of the first image feed;

allowing the vehicle to move from the first vehicle location to a second vehicle location;

for the second vehicle location, receiving additional vehicle location information, additional weather information, additional lighting information, or some combination thereof;

comparing the vehicle location information, weather information, lighting information, or some combination thereof of the first vehicle location with the additional vehicle location information, additional weather information, additional lighting information, or some combination thereof of the second vehicle location; and wherein, when the additional vehicle location information, additional weather information, additional lighting information, or some combination thereof of the second vehicle location is substantially similar to the vehicle location information, weather information, lighting information, or some combination thereof of the first vehicle location, the modified second image feed at the second vehicle location is further modified based on the vehicle location information, weather information, lighting information, or some combination thereof of the first vehicle location.

2. The method of claim 1, further comprising:
receiving vehicle speed information; and
wherein the second image feed is further modified based on the vehicle speed information.

3. The method of claim 1, further comprising:
receiving a third image feed from a third camera located on the vehicle;
receiving a fourth image feed from a fourth camera located on the vehicle;
receiving a fifth image feed from a fifth camera located on the vehicle; and
combining the first, second, third, fourth, and fifth image feeds together so as to generate a viewport image.

4. The method of claim 1, wherein the first camera is installed on a front fascia of the vehicle, and wherein the first image feed captures images of a portion of a vehicle environment located in front of the vehicle.

5. The method of claim 1, wherein the second camera is installed on an undercarriage of the vehicle, and wherein the second image feed captures images of a portion of a vehicle environment located under the vehicle.

6. A system to modify a second image feed from a second camera of a vehicle, the system comprises:
a memory configured to comprise one or more executable instructions and a processor configured to execute the executable instructions, wherein the executable instructions enable the processor to:
receive a first image feed from a first camera located on the vehicle;
receive vehicle location information, weather information, lighting information, or some combination thereof;
associate the vehicle location information, weather information, lighting information, or some combination thereof with the monitored one or more image characteristics of the first image feed;

monitor one or more image characteristics of the first image feed;

receive the second image feed from the second camera located on the vehicle;

based on the monitored one or more image characteristics of the first image feed, modify the second image feed to generate a modified second image feed such that one or more image characteristics of the second image feed are substantially similar to the monitored one or more image characteristics of the first image feed;

store the vehicle location information, weather information, lighting information, or some combination thereof to the memory while the vehicle is at a first vehicle location;

allow the vehicle to move from the first vehicle location to a second vehicle location;

for the second vehicle location, receive additional vehicle location information, additional weather information, additional lighting information, or some combination thereof;

compare the vehicle location information, weather information, lighting information, or some combination thereof of the first vehicle location with the additional vehicle location information, additional weather information, additional lighting information, or some combination thereof of the second vehicle location; and wherein, when the additional vehicle location information, additional weather information, additional lighting information, or some combination thereof of the second vehicle location is substantially similar to the vehicle location information, weather information, lighting information, or some combination thereof of the first vehicle location, the modified second image feed at the second vehicle location is further modified based on the vehicle location information, weather information, lighting information, or some combination thereof of the first vehicle location.

7. The system of claim 6, wherein the executable instructions enable the processor to:
receive vehicle speed information; and
wherein the second image feed is further modified based on the vehicle speed information.

8. The system of claim 6, wherein the executable instructions enable the processor to:
receive a third image feed from a third camera located on the vehicle;
receive a fourth image feed from a fourth camera located on the vehicle;
receive a fifth image feed from a fifth camera located on the vehicle; and
combine the first, second, third, fourth, and fifth image feeds together so as to generate a viewport image.

9. The system of claim 6, wherein the first camera is installed on a front fascia of the vehicle, and wherein the first image feed captures images of a portion of a vehicle environment located in front of the vehicle.

10. The system of claim 6, wherein the second camera is installed on an undercarriage of the vehicle, and wherein the second image feed captures images of a portion of a vehicle environment located under the vehicle.

11. A system to modify a second image feed from a second camera of a vehicle, the system comprises:
  a memory configured to comprise one or more executable instructions and a processor configured to execute the executable instructions, wherein the executable instructions enable the processor to:
  receive a first image feed from a first camera located on the vehicle;
  monitor one or more image characteristics of the first image feed;
  receive vehicle location information, weather information, lighting information, or some combination thereof;
  associate the vehicle location information, weather information, lighting information, or some combination thereof with the monitored one or more image characteristics of the first image feed;
  receive the second image feed from the second camera installed on an undercarriage of the vehicle, the second camera configured to capture an image of an area beneath the vehicle;
  based on the monitored one or more image characteristics of the first image feed, modify the second image feed to generate a modified second image feed such that one or more image characteristics of the second image feed are substantially similar to the monitored one or more image characteristics of the first image feed;
  for a second vehicle location, receive additional vehicle location information, additional weather information, additional lighting information, or some combination thereof;
  compare the vehicle location information, weather information, lighting information, or some combination thereof of a first vehicle location with the additional vehicle location information, additional weather information, additional lighting information, or some combination thereof of the second vehicle location; and
  wherein, when the additional vehicle location information, additional weather information, additional lighting information, or some combination thereof of the second vehicle location is substantially similar to the vehicle location information, weather information, lighting information, or some combination thereof of the first vehicle location, the modified second image feed at the second vehicle location is further modified based on the vehicle location information, weather information, lighting information, or some combination thereof of the first vehicle location.

12. The system of claim 11, wherein the executable instructions enable the processor to:
  store the vehicle location information, weather information, lighting information, or some combination thereof to the memory while the vehicle is at the first vehicle location; and
  allow the vehicle to move from the first vehicle location to the second vehicle location.

13. The system of claim 11, wherein the executable instructions enable the processor to:
  receive vehicle speed information; and
  wherein the second image feed is further modified based on the vehicle speed information.

14. The system of claim 11, wherein the first camera is installed on a front fascia of the vehicle, and wherein the first image feed captures images of a portion of a vehicle environment located in front of the vehicle.

* * * * *